Feb. 25, 1941.  S. J. NORDSTROM  2,233,220
LUBRICATED PLUG VALVE
Filed Sept. 15, 1938    3 Sheets-Sheet 3
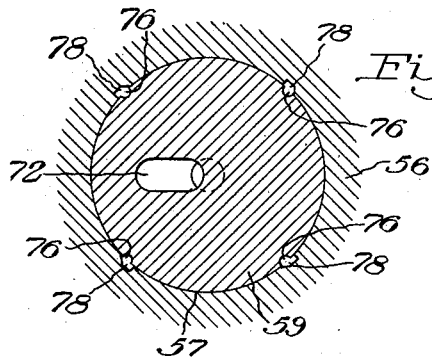
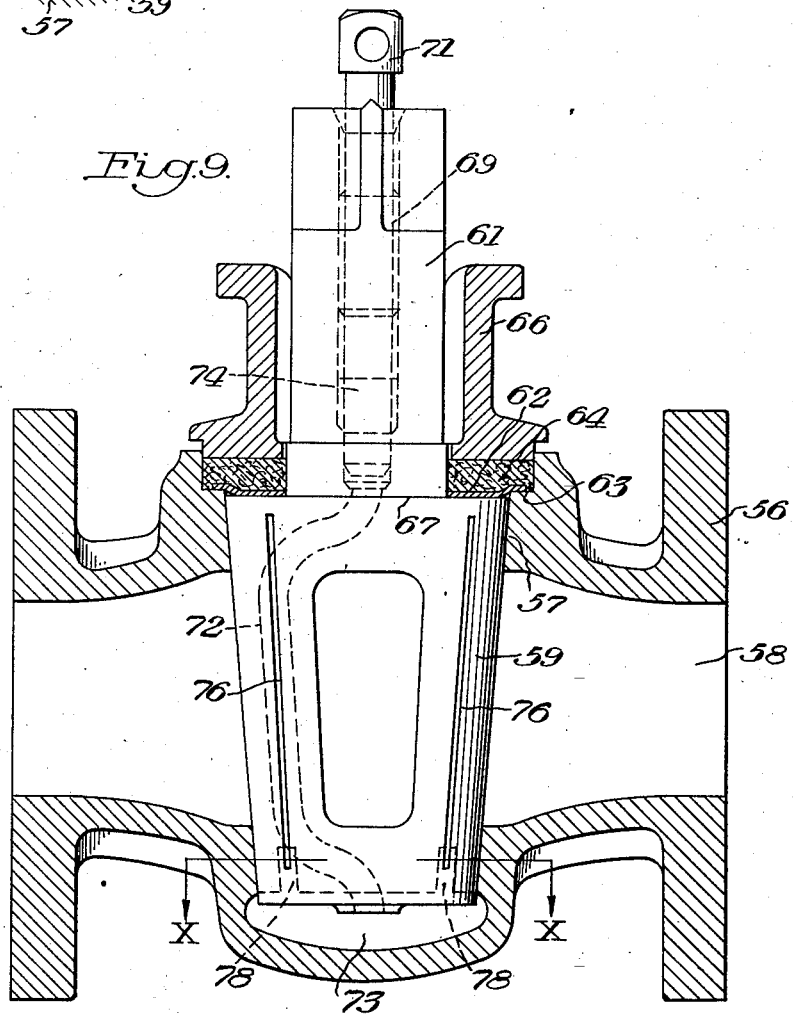
INVENTOR.
Sven J. Nordstrom.
BY
ATTORNEY.

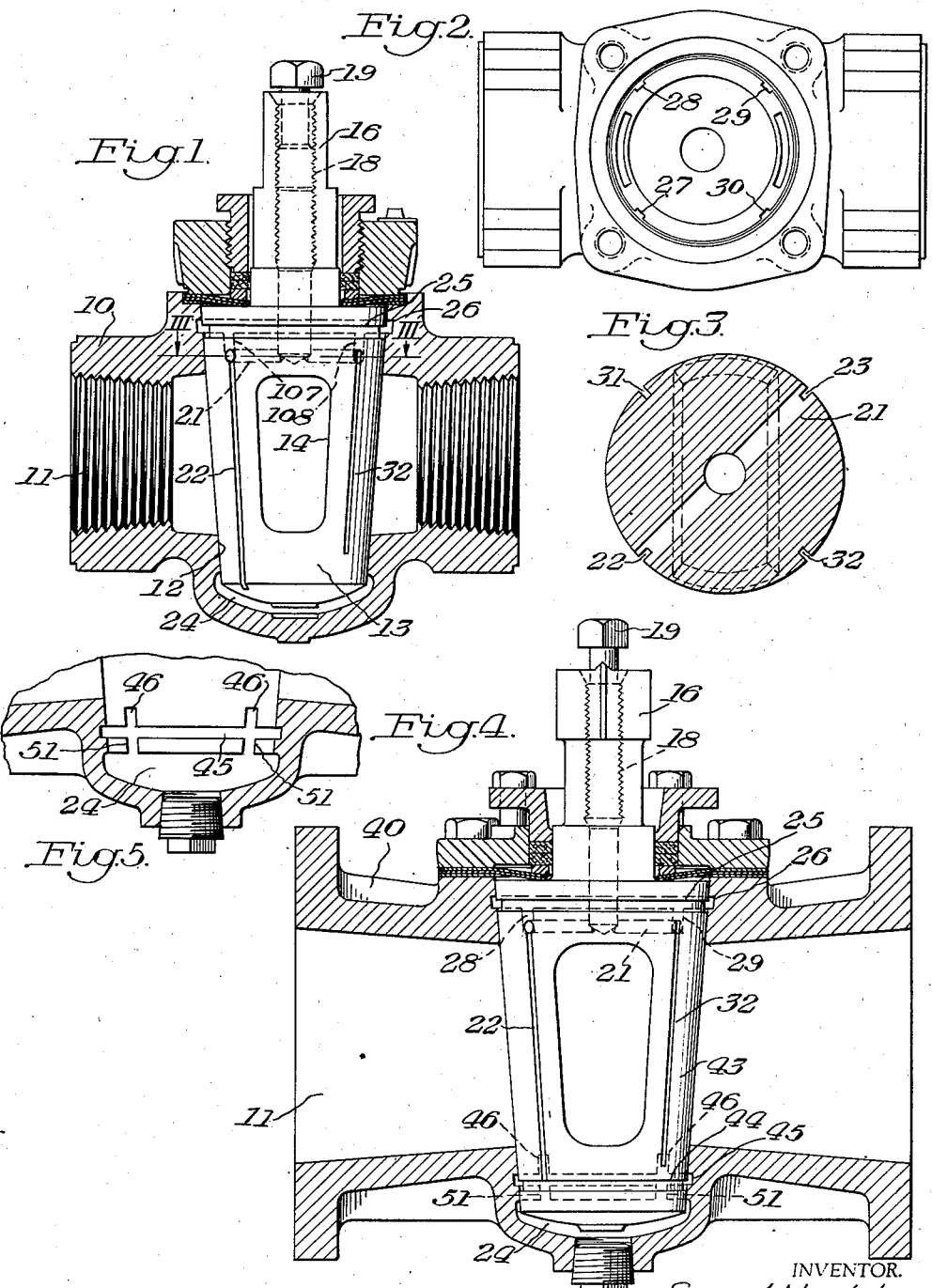

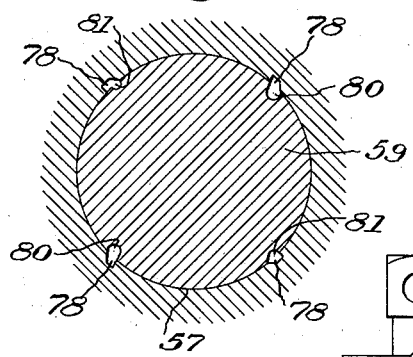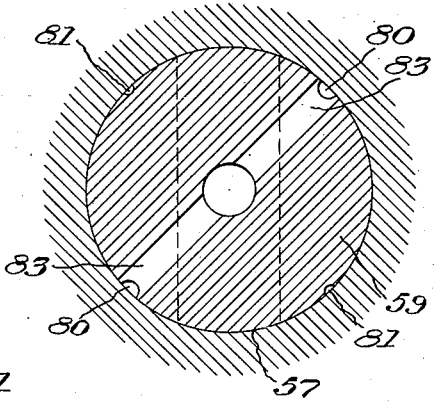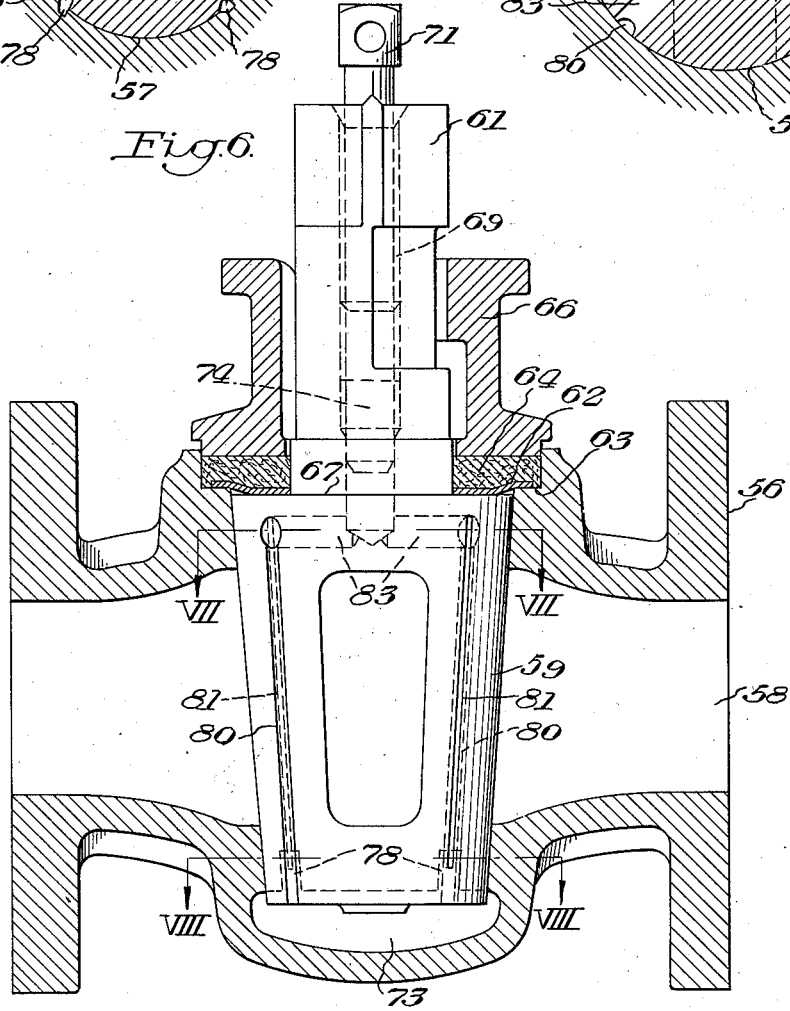

Patented Feb. 25, 1941

2,233,220

UNITED STATES PATENT OFFICE 2,233,220

LUBRICATED PLUG VALVE

Sven J. Nordstrom, Lafayette, Calif., assignor to Merco Nordstrom Valve Company, Pittsburgh, Pa., a corporation of Delaware Application September 15, 1938, Serial No. 230,105

6 Claims. (Cl. 251—93)

This invention relates to plug valves of the type having provision for applying viscous lubricant under pressure to certain parts thereof. It has particular application to such valves having tapered plugs, and which employ the compressed lubricant to hydraulically jack the plug from its seat.

This application is a continuation in part of my application for Plug valve, filed June 1, 1931, Serial No. 541,218, now Patent 2,029,438, granted Feb. 4, 1936, and of my application for Plug valve, filed November 26, 1935, Serial No. 51,690.

The lubricant system employed according to the present invention involves an arrangement of longitudinal lubricant conducting grooves in the plug surface, some of which are at all times connected to the source of lubricant pressure and which communicate with a lubricant chamber at the smaller end of the plug, the other grooves being disconnected from the source of lubricant pressure only when exposed to line fluid. The larger end of the plug is sealed by a circumferential groove which communicates with the reservoir only in certain positions of the plug. Where the size of the valve is small enough, the smaller end of the plug is sealed by the lubricant chamber, or in larger valves a circumferential groove is provided at the smaller end. Preferably, the lubricant grooves are arranged to form a substantially complete lubricant seal about the valve passage in closed position of the valve.

Accordingly, it is an object of the invention to increase the effectiveness and efficiency of the lubricant system in plug valves.

It is a further object of the invention to provide plug valves with a novel lubricant system therein that enables hydraulic jacking of the plug with respect to its seat and lubrication and sealing of the valve working surfaces in a more efficient manner than heretofore experienced.

It is another object of the invention to provide a new arrangement or form of lubricant channels interrupting the valve working surfaces of a plug valve utilizing lubricant under pressure, whereby the advantages of sealed port lubrication can be secured without an undue washing away of the lubricant in certain channels which are exposed to the line pressure when the plug is turned between open and closed positions.

Further objects of the invention will appear from the following description, in which the preferred embodiments of the invention are set forth in detail in conjunction with the accompanying drawings, wherein:

Figure 1 is a view in vertical cross section of a valve incorporating the present invention, Figure 2 is a plan view of the casing shown in Figure 1, with the cover and plug removed, Figure 3 is a cross sectional view of the plug taken along the line III—III of Figure 1, Figure 4 is a view in vertical cross section illustrating a modified form of plug valve incorporating the present invention, Figure 5 is a fragmentary sectional view of the casing similar to Figure 4 with the plug removed, Figure 6 is a view in cross section illustrating a modified form of plug valve incorporating the present invention, Figure 7 is a cross sectional view of the plug taken along the line VII—VII of Figure 6, Figure 8 is a cross sectional detail taken along the line VIII—VIII of Figure 6, Figure 9 is a view in cross section illustrating a further modification of my invention, and Figure 10 is a cross sectional detail taken along the line X—X of Figure 9.

Referring first to the modification illustrated in Figures 1 to 3 inclusive, the valve shown therein comprises a casing 10 having a transverse passageway 11 for flow of fluid and a tapered valve seat or bore 12 extending transversely to the passageway 11. A tapered plug 13 is rotatably positioned within the valve seat 12 and has a port 14, adapted to register with passageway 11 for open position of the valve. A stem 16, operably connected to the large end of plug 13, is provided for turning the plug. The arrangement of sealing washers and packing rings is substantially like that illustrated in my Patent No. 781,821, issued November 18, 1930, and as it forms no part of the present invention, it will not be described here.

The lubricating system of the valve comprises a reservoir 18 in the stem of the valve which is threaded and receives a lubricant compressing screw 19, a suitable check valve being provided in this chamber, if desired, to prevent refluxing of lubricant or escape of line fluid. The end of reservoir 18 communicates with a substantially diametrical bore 21 extending through the valve, and lubricant grooves 22 and 23 in the plug surface connect the ends of the bore 21 with a chamber 24 provided at the smaller end of the plug. Above the diametrical bore 21 is a circumferential groove 25 in the plug surface and directly opposite the groove 25 is a circumferential groove 26 in the valve seat having four longitudinal extensions or dwarf grooves 27, 28, 29 and 30 of sufficient length so as to communicate with longitudinal plug grooves 22 and 23 when longitudinally aligned therewith. On the opposite side of port 14 are a pair of longitudinal grooves 31 and 32 which terminate at their upper ends short of circumferential groove 25 and are arranged to communicate with the dwarf grooves 27, 28, 29 and 30 when aligned therewith, and which terminate short of the lubricant chamber 24.

The operation of the lubricating system for the valve is as follows:

When the valve is in closed position, as shown in Figure 1, lubricant is supplied from the reservoir 18 through the diametrical bore 21 and is forced through longitudinal grooves 22 and 23 to the lubricant chamber 24 at the smaller end of the plug. Lubricant is also supplied through the dwarf grooves 27 and 29 to the circumferential grooves 25 and 26 in the plug and body, and by dwarf grooves 28 and 29 to the short longitudinal grooves 31 and 32, respectively. Thus, the lubricant in grooves 22 and 23 and in circumferential grooves 25 and 26 is under greater pressure than the lubricant in chamber 24 when the plug is jacked from its seat because of the viscous nature of the lubricant so that lubricant is extruded from the grooves and prevents the entrance of foreign material between the plug and seat. The chamber 24 preferably is located in the same distance from the edge of the plug port as the longitudinal grooves, but may be located at a distance as much as about twice the space between the grooves 22, 23 or 31, 32 and the edge of the plug port 14. As the grooves are located in the plug surface, they can be machined relatively narrow so that they will have the desired cross sectional area and will present a relatively small surface to line fluid so that lubricant cannot be easily washed or blown therefrom by line fluid when the grooves are in exposed position. The longitudinal grooves 22, 23, 31 and 32 in the plug preferably have a radial depth substantially equal to the width of the groove along the plug surface. Furthermore, by locating the exposed grooves in the plug they are removed from direct impingement of line fluid when the valve is in partly open position.

In turning the valve to open position the plug is turned counterclockwise as viewed in Figure 3, so that grooves 31 and 32 are disconnected from dwarf grooves 28 and 30, and remain disconnected while these grooves are exposed to line fluid. In exposed or intermediate position, lubricant cannot escape from the system into the line and line fluid cannot enter the system to wash out the lubricant therefrom. A suitable stop is provided to limit rotation of the valve to ninety degrees, and in open position grooves 31 and 32 connect with dwarf grooves 27 and 29 while grooves 22 and 23 connect with dwarf grooves 28 and 30.

In the modification shown in Figures 4 and 5, wherein like parts are correspondingly numbered to agree with Figures 1 to 3, the plug 43 has a circumferential groove 44 adjacent the smaller end, and a circumferential groove 45 located directly opposite in the casing which has four dwarf grooves 46 extending upwardly therefrom. Longitudinal grooves 22 and 23 in the plug connect with the end of radial bore 21 and with the circumferential groove 44, and longitudinal grooves 32, 31 terminate short of circumferential grooves 25 and 44 and are arranged to communicate with dwarf grooves 27, 28, 29 and 30 and 46 when aligned therewith. Four dwarf grooves 51 or any other suitable groove arrangement connect circumferential groove 45 with the lubricant chamber 24. This construction is of particular value in large valves wherein the chamber 24 is too far removed from the passageway 11 to the valve so that lubricant therefrom provides an insufficient seal for the lower end and an auxiliary chamber in the form of the circumferential grooves 44 and 45 is desirable. The grooves 22 and 23 in this modification communicate at all times with the chamber 24 by reason of their connection with the circumferential groove 44 which communicates at all times with chamber 24 through connecting grooves 51.

In the modification illustrated in Figures 6 to 8 inclusive, the valve casing 56 is provided with a tapered valve seat 57 arranged transversely of the fluid passageway 58. Tapered valve plug 59 is disposed within seat 57 and is provided with a valve stem 61. A flexible metallic diaphragm 62 has its outer peripheral portion engaging shoulder 63 formed on the valve casing, and the entire upper surface of this diaphragm is engaged by the annular resilient packing 64. Follower or cover 66, which is bolted or otherwise secured to casing 56, presses down upon the upper surface of packing 64, and this packing in turn forces the inner peripheral portion of diaphragm 62 into engagement with the annular shoulder 67 formed upon the valve plug 59. The lubricating system of the valve includes a threaded bore 69 extending axially of stem 61, into which the lubricant pressure screw 71 is threaded, and the tapered plug 59 is provided with longitudinal channels 80 and 81, interrupting its periphery, the channels 80 communicating at their lower end with lubricant chamber 73 and being connected at their upper ends to the lubricant reservoir or chamber 69 by radial duct 83 extending through the plug and connected with bore 69. The lower ends of channels 81 stop short of the small end of the plug and are adapted to communicate with chamber 73 through connecting dwarf grooves 78 formed in the lower portion of the valve seat. The grooves 81 preferably have a relatively small surface area so as to avoid washing out of lubricant when these grooves are exposed to line fluid. Check valve 74 is positioned in bore 69 below screw 71.

Turning movement of the plug is limited to 90° by suitable stops. Figure 7 illustrates closed position, and to open the valve the plug is turned 90° in a counterclockwise direction. In turning the plug channels 81 are exposed to the line fluid, but at this time they are cut off from the lubricant chamber 73 so that lubricant cannot escape therefrom into the line. In full open and closed positions all of the channels 80 and 81 are in communication with chamber 73 so that the valve passage is substantially completely sealed by lubricant chamber 73 and grooves 80 and 81. The larger lubricant channels 80 serve to effectively transmit the lubricant pressure to chamber 73, without undue lag or loss in pressure.

In the modification illustrated in Figures 9 and 10, arrangement of lubricant channels in the valve working surfaces consists of four spaced longitudinal channels 76 formed in the periphery of the plug 59 and terminating short of the ends of the plug. Formed in the lower portion of the tapered valve seat are four spaced longitudinal channels 78 for full open and closed positions of the plug, and which also communicate at all times with lubricant chamber 73. A lubricant duct 72 extends downwardly through plug 59, the end of this duct communicating with and forming a part of bore 69, and the lower end of the duct communicates with the lubricant chamber 73.

In operating the valve the screw 71 is turned in sufficiently to develop lubricant pressure in chamber 73 to jack the plug from its seat. Leakage past the small end of the plug and around the sides of the plug is prevented by lubricant extruded from chamber 73 and channels 76 and 78. In intermediate positions of the plug the two exposed channels 76 are cut off from communication with the connecting grooves 78, thus preventing washing out of lubricant from the remainder of the lubricant system. In this construction it is not necessary to prevent rotation of the plug through more than 90°, so that no stop is required.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a plug valve, a casing having a passageway therethrough for flow of fluid and a tapered bore formed transversely of said passageway, a stem for operating said valve, a tapered plug having a port therethrough seated in said bore, said valve having a lubricating system comprising a lubricant chamber at the smaller end of the plug, at least one pair of longitudinal lubricant grooves in the plug surface at opposite sides of the port terminating short of the larger end of the plug, one groove of said pair connecting at one end with the lubricant chamber at all positions of said plug, a reservoir in the valve stem for supplying lubricant under pressure to said latter groove, a circumferential groove in the seat spaced from the larger end of the plug spaced from the adjacent ends of the longitudinal grooves of said pair, and individual short grooves in said seat communicating said circumferential groove with the longitudinal grooves of said pair at their ends opposite the lubricant chamber in full open and closed positions of the valve only.

2. In a plug valve, a casing having a passageway therethrough for flow of fluid and a tapered bore formed transversely of said passageway, a stem for operating said valve, a tapered plug having a port therethrough seated in said bore, said valve having a lubricating system comprising a lubricant chamber at the smaller end of the plug, a circumferential lubricant groove in the seat spaced from said chamber and having at least one connecting groove to said chamber, a mating circumferential groove in the plug surface, at least one pair of longitudinal lubricant grooves in the plug surface terminating short of the larger end of the plug, one groove being in communication with the circumferential groove in the plug surface, and said circumferential groove in the seat having connecting grooves connecting with the longitudinal grooves in full open and closed positions of the valve, and a circumferential groove in the seat at the opposite end of the plug spaced from the end and having longitudinal extensions communicating with the longitudinal grooves in full open and closed positions of the valve, and means for supplying lubricant under pressure to the longitudinal grooves.

3. In a plug valve, a casing having a passageway therethrough for flow of fluid and a tapered bore formed transversely of said passageway, a stem for operating said valve, a tapered plug having a port therethrough seated in said bore, said valve having a lubricating system comprising a lubricant jacking chamber formed by the casing and smaller end of the plug, a pair of diametrically opposed longitudinal lubricant grooves in the seating surface of the plug and casing constantly in communication with said jacking chamber and terminating short of the larger end of the seating surface of the plug and casing, each groove being located adjacent one side of the port so as to be unexposed in normal rotation of the plug, a reservoir in the valve stem for supplying lubricant under pressure to said grooves, a second pair of diametrically opposed longitudinal lubricant grooves in the plug surface terminating short of said jacking chamber and of the larger end of the seating surface, each groove of said latter pair being located adjacent the opposite side of the port and being exposed in the normal rotation of the plug, a circumferential groove in the seating surface of the plug and casing uniformly spaced from the larger end of the plug and spaced from the adjacent ends of said pairs of longitudinal grooves, short longitudinal grooves in said seating surface individually connecting said circumferential groove with said longitudinal grooves at fully open and fully closed positions of the valve only, and means for applying pressure to lubricant in said reservoir to separate the surfaces of the plug and seat and lubricate said surfaces.

4. In a plug valve, a casing having a passageway therethrough for flow of fluid and a tapered bore formed transversely of said passageway, a stem for operating said valve, a tapered plug having a port therethrough seated in said bore, said valve having a lubricating system comprising a lubricant chamber at the smaller end of the plug, a circumferential lubricant groove spaced from said chamber interrupting the seating surface of the plug and seat and having at least one connecting groove to said chamber, at least one longitudinal lubricant groove interrupting the seating surface of the plug and seat and terminating short of the larger end of the plug and being in communication with said circumferential groove at all times, at least one other longitudinal lubricant groove in the plug surface terminating short of the larger end of the plug and terminating short of the smaller end of the plug, said circumferential groove having connecting grooves connecting with said other longitudinal groove in full open and closed positions of the valve, a second circumferential groove at the larger end of the plug interrupting the seating surface of the plug and seat beyond the adjacent ends of said longitudinal grooves, short longitudinal grooves interrupting said seating surface and communicating said second circumferential groove with said above mentioned longitudinal grooves in full open and closed positions of the valve, and means for supplying lubricant under pressure to the lubricating system.

5. In a plug valve, a casing having a passageway therethrough for flow of fluid and a tapered bore transversely of the passageway, a tapered plug having a port therethrough seated in said bore, a lubricant jacking chamber between the casing and the smaller end of the plug, a first pair of diametrically opposite longitudinal grooves on said plug terminating short of the larger end of said plug but connecting at one end with said chamber at all positions of said plug, a second pair of diametrically opposite longitudinal grooves on said plug terminating short of the larger end of said plug and also terminating short of the smaller end of said plug, an uninterrupted circumferential groove on the larger end of the plug beyond the adjacent longitudinal groove ends, an opposed uninterrupted circumferential groove on said seat open to said circumferential groove on the plug, four short longitudinal grooves on said seat communicating said circumferential grooves with said pairs of longitudinal grooves in fully open and fully closed positions of the valve only and means supplying lubricant under pressure to said grooves.

6. In the plug valve defined in claim 5, said last-named means comprising a valve stem on said plug, a lubricant reservoir in said stem, and radial passages in said plug connecting said reservoir to the ends of said first pair of longitudinal grooves at the larger end of said plug.

SVEN J. NORDSTROM.

CERTIFICATE OF CORRECTION.

Patent No. 2,233,220. February 25, 1941.

SVEN J. NORDSTROM.

It is hereby certified that error appears in the printed specification of the above numbered patent requiring correction as follows: Page 1, second column, line 35, for the patent number "781,821" read --1,781,821--; page 2, first column, line 65, for "and" first occurrence, read --end--; page 3, first column, line 46, claim 1, after "plug" insert --and--; and that the said Letters Patent should be read with this correction therein that the same may conform to the record of the case in the Patent Office.

Signed and sealed this 20th day of May, A. D. 1941.

(Seal)

Henry Van Arsdale,
Acting Commissioner of Patents.